United States Patent [19]

Brooks

[11] 3,896,532

[45] July 29, 1975

[54] CUTTER INSERT SPINDLE

[76] Inventor: Norman Darrell Brooks, 6410 Centennial Dr., Toledo, Ohio 43613

[22] Filed: Nov. 30, 1973

[21] Appl. No.: 420,385

[52] U.S. Cl............................. 29/105 R; 29/103 A
[51] Int. Cl.².......................................... B26D 1/12
[58] Field of Search...... 29/96, 95 R, 103 R, 103 A, 29/105 R; 144/87, 219, 220, 240, 241

[56] References Cited
UNITED STATES PATENTS

| 843,376 | 2/1907 | Tombragel et al................ 29/103 A |
| 3,250,154 | 5/1966 | Breuning................................ 29/96 |
| 3,335,480 | 8/1967 | Cashman .............................. 29/96 |
| 3,461,751 | 8/1969 | Dupuis................................ 29/96 X |

Primary Examiner—Leonidas Vlachos

[57] ABSTRACT

A generally cylindrically shaped cutter insert spindle having a centrally located longitudinal axis of rotation, and the lower end of which has an abutment thereon whose external surface defines a frustrum of a cone. The exterior surface of the abutment makes an angle of between approximately 8° and 30° with the longitudinal axis. The spindle carries a hardened cutter insert with its cutting edge supported over the edge of the frustrum shaped abutment. In the preferred embodiment, the cutter insert is supported in an oblique angle which forms both an angle with respect to an imaginary plane passing through the longitudinal axis, and forms another angle with the imaginary plane which extends at right angles to the longitudinal axis.

5 Claims, 5 Drawing Figures

PATENTED JUL 29 1975  3,896,532

CUTTER INSERT SPINDLE

BACKGROUND OF THE INVENTION

The present invention relates to a cutter insert spindle for a metal profiling apparatus and the like; and to a metal profiling machine which utilizes a stylus which senses the contour of a model and a cutter which machines away a block of metal to duplicate the contour of the model contacted by the stylus. Machines of the type with which we are concerned are used, for example, to form the metal stamping dies that produce the roofs, fenders, hoods, etc. for automobiles and trucks. They are also used to form the matched metal dies that are used to mold fiber reinforced plastics in the shape of roofs, fenders, hoods, etc. for automobiles and trucks. They are also used to machine metal into complicated shapes for use as structural parts of airplanes, missiles, bath tubs, etc.. The apparatus with which we are concerned comprises massive machinery having beds which are precisely movable along accurate ways, and which beds are capable of carrying blocks of steel weighing 20 tons or more. A full scale model of the part which is to be produced is mounted on one end of the bed and the block of metal is positioned on the other end of the way. A superstructure is mounted above the bed for carrying both a stylus adapted to sense the contour of the model, and a rotary head for contouring the block of metal. The stylus and rotary head are mounted on vertical and horizontal ways; and suitable electronic and hydraulic mechanisms are provided for moving the head vertically and horizontally of the bed to move in accordance with the shape of the model which is sensed by the stylus as the head is moved transversely of the longitudinal ways supporting the bed. The bed is indexed longitudinally after each transverse pass of the cutter until the entire contour of the model is duplicated in the block of metal being machined.

It will now be seen that the cutter must be able to cut both horizontally and vertically; and prior to the present invention, this has been accomplished using the type of rotary cutter that has long been used in end mills. The cutters used in end mills have a plurality of peripheral teeth, the cutting edge of which define a cylinder such that each tooth removes an identical amount of metal and such that the machined surface will be truely vertical. The lower end of the teeth of such cutters has a suitable relief so that the cutter can be fed horizontally to machine a horizontal surface. In some instances the teeth have been made in the form of inserts that are clamped into the cutter bar; but in all instances with which applicant is aware, the teeth have defined a generally cylindrical surface.

Applicant has found that the rotary cutters used heretofore and which employ cylindrically shaped cutting edges are limited in the amount of metal which can be removed per pass; and he has further found that he can greatly increase the capacity of metal contouring machines by utilizing a rotary cutter of a new and improved design.

One of the problems that is involved with rotary cutters is that they can produce destructive chatter when they are overloaded. The reason why chatter is produced is not fully understood. According to one theory, the lack of homogeneity in the metal causes the cutter surfaces to be subjected to constantly changing cutting conditions, which at high loading, produces deflections in the spindle which in turn alternately increases and decreases the loads on the cutting surface, which in turn causes further deflection of the spindle. This theory, of course, is very logical and would cause one to believe that the solution to the problem was in the use of larger and more rigid spindles.

An object of the present invention is the provision of a new and improved rotary cutter for metal contouring machines which greatly reduces chatter without increasing the diameter of the cutter spindle, and so that the improved cutter can be used in existing metal profiling machines.

A further object of the present invention is the provision of a new and improved rotary cutter of the above described type which can utilize cutter insert discs having side surfaces that are perpendicular to the major surfaces of the discs.

Further objects and advantages of the invention will become apparent to those skilled in the art to which it relates from the following description of the preferred embodiments described with reference to the accompanying drawings.

DESCRIPTION OF THE PREFERRED EMBODIMENTS

Figure 1:
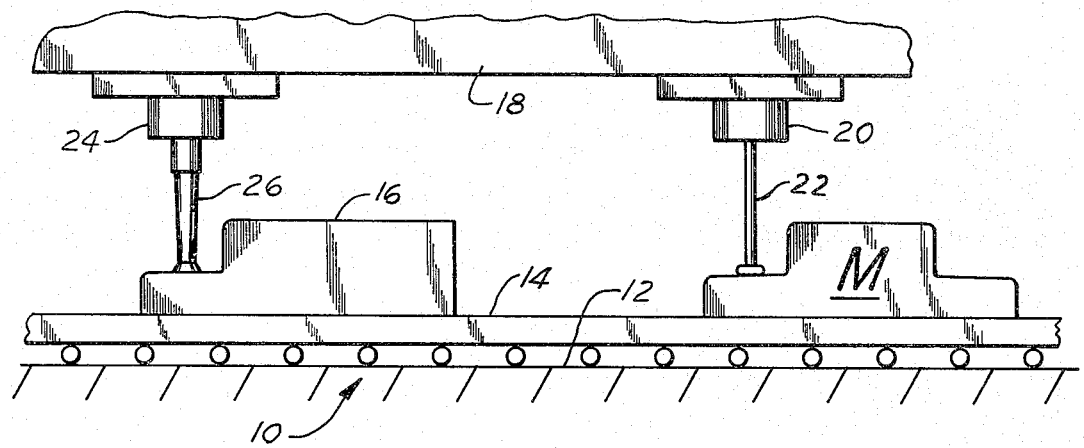
FIG. 1 is a schematic view of a metal profiling machine which utilizes a cutter insert spindle of the present invention.

As previously indicated the present invention relates to machines for cutting large blocks of metal into a configuration corresponding to that of a full scale model. In order that the operation of such a machine can be easily understood, a schematic view of such apparatus is shown in FIG. 1 of the drawings. The machine generally comprises a base 10 having longitudinally extending ways thereon for supporting a bed 14 for longitudinal movement. In order that the movements of the machine can be conveyed quickly to the eye, the bed 14 is shown supported from the base 10, by plurality of rollers. This, of course, is a schematic way of indicating a support for relative movement. A model M is shown positioned on one end of the bed 14, and a block of steel 16 is shown positioned adjacent the other end of the bed 14. The machine also includes a movable head 18 having suitable apparatus 20 for supporting and sensing the movement of a stylus 22 which engages the surface of the model M. The apparatus 20 is a combination of electronic sensing and a hydraulic actuating means driven thereby for raising and lowering the head 18 in accordance with the surface of the model M as sensed by the stylus 22. The other end of the head 18 includes a chuck 24 which rotates at a generally fixed speed about a vertical axis and which receives a cutter spindle 26 for machining the block 16 to provide a configuration corresponding to that of the model M. The spindle 26 has suitable chucking surfaces on its upper end to effect a rotatable drive thereof by the chuck. The machine shown is operated by indexing the bed 14 longitudinally to bring the stylus over a portion of the model. In this position the bed 14 is held stationary and the head 18 is moved transversely thereto to bring the stylus across the model M at right angles to the bed 14 of the machine. As the stylus 22 traverses the model M, it senses the surface, and the movement imparted to the stylus 22 by the model M causes the head 18 to raise and lower in conformance with the contour of the model M. Simultaneously therewith the cutter 26 rotates to remove metal from the block 16. It will be seen that in the final stages of the machining (when after the block 16 has been hogged out to generally conform its shape to the model M) the cutter 26 will provide a surface which corresponds exactly to that of the model M. After each transverse pass of the head 18, the bed 14 is indexed longitudinally to bring another portion of the model M into the path of the stylus 22, and the process is repeated until the block 16 is contoured to correspond to that of the model M.

Figure 2:
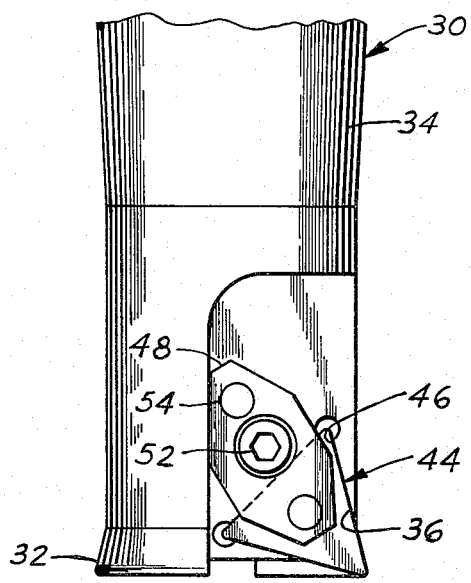
FIG. 2 is a side elevational view of a cutter insert spindle embodying the present invention.

FIG. 2 shows the lower end of the preferred embodiment of new and improved cutter insert spindle 30 of the present invention. The preferred embodiment of spindle 30 shown in the drawing is generally cylindrically shaped excepting that its lower end is enlarged in the shape of a frustrum 32 of a cone. The spindle 30, of course, has an axis of rotation 34 and the surface of the frustrum 32 forms an angle therewith of from approximately 8° to 30°, preferably from 10° to 22°, with an optimum angle of approximately 15°. The cutter insert spindle 30 is provided with one or more cutting surfaces which are preferably made part of a hardened insert, and will preferably include two or more of such cutting surfaces. In the embodiment shown in the drawings, two cutter inserts are provided, and these are located diametrically opposite from each other. The inserts are located in cutter insert pockets 36 which in turn are in the bottom 38 of clamp pockets 40.

Each cutter insert pocket 36 has a floor 42 for firmly supporting a cutter insert 44, and has side surfaces 46 which act as abutments for retaining its cutter insert 44. While the floor and side surfaces need only contain abutment portions for confining the appropriate edges of the insert, in the preferred embodiment, they are continuous and conform generally in shape to the insert 44. The cutter insert pocket 36 has a depth which is just slightly less than that of the cutter insert 44, and the cutter insert 44 is held down into its pocket 36 by suitable means which in the embodiment shown comprises an eight-sided clamp 48.

The eight-sided clamp 48 has a centrally located opening 50 for a clamping screw 52 which passes therethrough and which is threaded into the body of the spindle 30. The eight-sided clamp 48 has another opening 54 for receiving a pin 56 that is embedded in the floor of the clamp pocket 40 to prevent rotation of the clamp 48 about its clamping screw 52.

Figure 3:
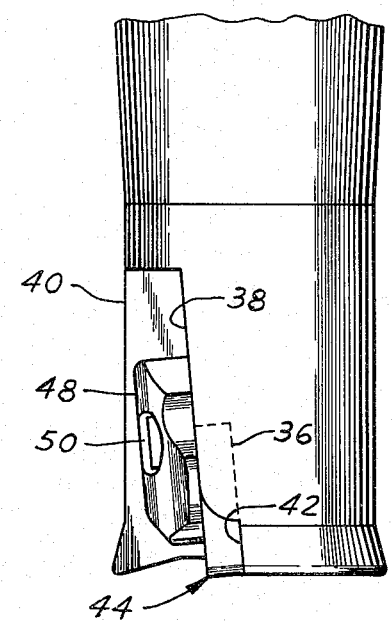
FIG. 3 is a side view of the spindle shown in FIG. 2.
Figure 4:
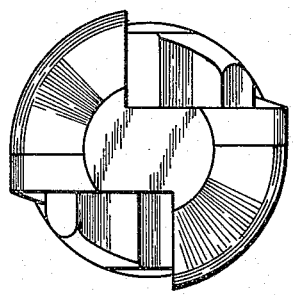
FIG. 4 is an end view of the spindle shown in FIG. 2.
Figure 5:
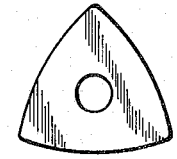
FIG. 5 is another embodiment of cutter insert which can be used in another embodiment of spindle of the present invention.

The cutter insert pocket 36 is so located that the bottom edge of the insert 44 is positioned directly over the radially outer surface of the frustrum 32 so that the outer lower edge of the cutter 44 is firmly supported. In order to provide cutting clearance angles for the insert cutter 44, the sides of the cutter 44 can be tapered inwardly at the bottom and the floor of the pockets 36 and 40 can be parallel to the plane passing through the axis of rotation 34 or can be tipped slightly inwardly or outwardly. In the preferred embodiment, however, the floor of the pockets 36 and 40 are inclined upwardly and outwardly from the axis of rotation, and the sides of the cutter 44 are perpendicular to their top and bottom major surfaces, so that all of the top and bottom edge surfaces of the cutter can be used as cutting surfaces. The floors 38 and 42 of the pockets 36 and 40 respectively are tilted outwardly at their upper end to the axis of rotation 34 at an angle that may vary from approximately 3° to 12°, and as shown in the drawings, is at a preferred angle of approximately 5°. The cutter 44 shown in the drawings is triangularly shaped so that there are a total of 6 positions in which the cutter can be used before it need be replaced. By holding the cutter insert 44 in an angle as above described, cutter inserts of uniform cross section can be used while still providing clearance for the cutting surfaces of the cutter insert along both the side and lower cutting surfaces of the cutter insert 44. While the preferred configuration of cutters shown in FIGS. 2 through 4 of the drawings is triangular with rounded corners of approximately 3/32nd of an inch radius, other configurations can be used provided they have included angles less than 90°. Such a cutter is shown in FIG. 5 of the drawings. The cutter shown in FIG. 5 is generally of triangular shape but has rounded sides between the corners of the cutter. A diamond shape can also be used.

Now that an understanding of the construction and operation of the preferred embodiments of the invention has been had, it will be readily apparent that still other embodiments of the invention can be made employing the inventive aspects of the present invention. It will be apparent that the frustrum 32 need not be continuous, but need only define a frustrum of a cone to provide support for the lower outer corner of the cutter insert. It will further be apparent that the cutting edge can be formed as an integral part of the spindle without being an insert. In all preferred instances, however, it will comprise an insert because of the ease in manufacture of the hardened cutting edge and the ease of replacement which the insert provides.

The cutters of the present invention provide the capability of removing approximately twice as much metal per cut as do prior art cutters having a generally cylindrically shaped radial outer cutting surface. The cutter spindles of the present invention can accommodate feeds of about twice that of prior cutters without producing chatter, and this is true whether the feed is vertical or at an oblique angle. All of the reasons why the cutter is capable of removing greater amounts of metal than are the prior art cutters is not fully understood, but the cutters described above have made it possible to save over 100 hours of machine time in the production of a single matched metal die for producing the hood of an automobile from glass fiber reinforced sheet molding compounds. Since these machines are very large and complex, their cost of operation is approximately $40.00 per hour. It can now be seen that the present invention, therefore, saves approximately $4,000.00 in the production of a single matched metal die having the size and shape of a hood of an automobile. As far as applicant is aware, there has never been a single development in cutters for contouring machines which saves as much money as does the present invention.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates and are covered by the appended claims.

I claim:

1. A milling cutter for a profile duplicating machine and the like, comprising: a milling cutter body having an intermediate generally cylindrical portion with a centrally located axis of rotation extending therethrough, an upper end chucking portion, and an enlarged lower end tip portion having a sloping bottom surface which extends downwardly and outwardly and having a lateral side surface forming an angle of approximately 60° with said sloping bottom surface, said side surface forming an angle of between approximately 8° and approximately 30° with said axis of rotation, said intermediate and enlarged lower end portions having a generally triangularly shaped pocket therein with the sides of one apex thereof being generally coincident with said bottom and side surface of said tip portion, said pocket having a bottom surface for supporting a generally triangularly shaped cutter with edges of one apex of the cutter generally coincident with said apex of said pocket, said bottom sloping outwardly at an angle between 3° and 12° from the diametral plane when proceeding longitudinally upwardly with respect to said axis of rotation, said bottom of said pocket being constructed and arranged to support the top edge of the insert above said diametral plane, and clamp means for holding the cutter insert in said pocket.

2. The milling cutter of claim 1 having a generally triangularly shaped cutter of uniform thickness and parallel side surfaces in said pocket.

3. A milling cutter for a profile duplicating machine and the like, comprising: a milling cutter body having an intermediate generally cylindrical portion, an upper end chucking portion, and an enlarged lower end generally conical tip portion with an axis of rotation extending through said portions, said conical tip portion extending outwardly and downwardly from said cylindrical portion in the form of an apex of a triangle the laterally outer surface of which forms an angle between approximately 8° and approximately 30° with the longitudinally extending axis and the two sides of said apex forming an angle with each other of approximately 60°, a generally triangularly shaped cutter insert pocket in said cylindrical and tip portions with the side edges of one apex of the pocket being generally coincident with the side edges of said apex of said tip portion, said pocket having a bottom surface which slopes upwardly and outwardly at an angle between approximately 3° and 12° relative to an imaginary diametral plane which passes through the longitudinal axis, said cutter insert pocket being constructed and arranged to support the top surface of a triangularly shaped cutter insert of predetermined thickness above the diametral plane, and clamp means for holding said cutter insert in said pocket, and whereby working relief is provided on both surfaces of a cutter insert positioned over said tip portion and the cutter will remove metal when moved laterally or longitudinally.

4. The milling cutter of claim 3 wherein said radially outer side support surfaces form an angle to said axis of between 8° and 22°.

5. The milling cutter of claim 4 wherein said radially outer side support surfaces form an angle to said axis of approximately 15°.

* * * * *